E. H. DEWSON.
CAR BRAKE MECHANISM.
APPLICATION FILED OCT. 22, 1915.
1,269,263. Patented June 11, 1918.
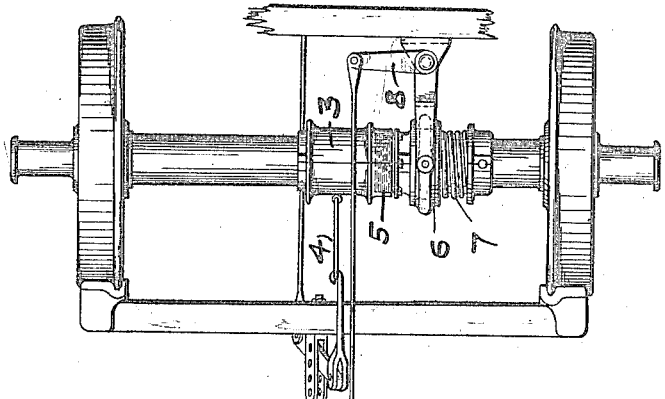
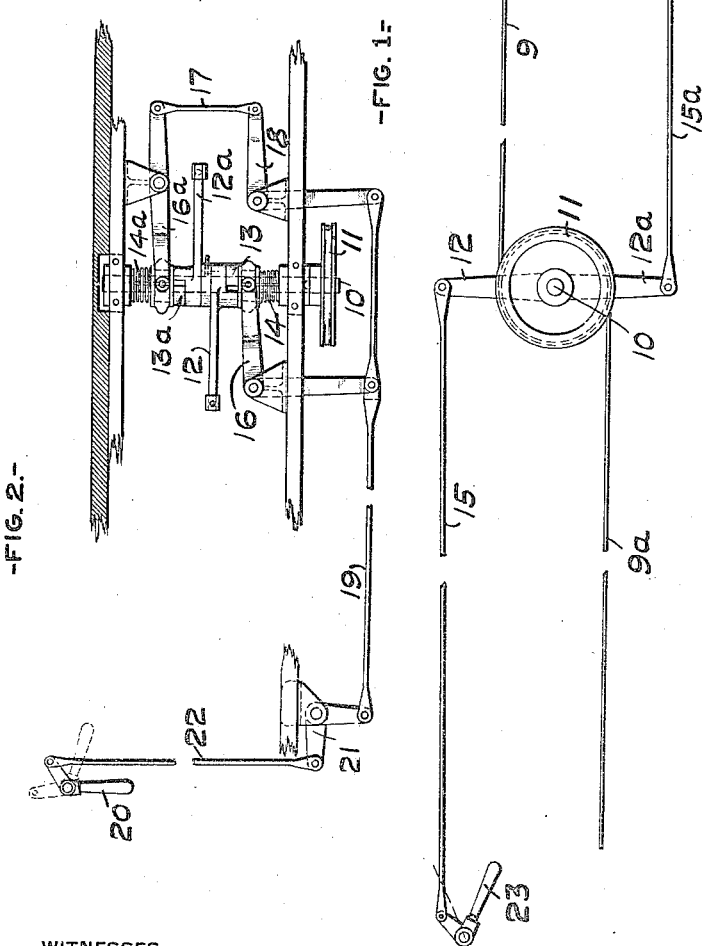
WITNESSES
INVENTOR
Edward H. Dewson
by Edward Wright
Atty.

UNITED STATES PATENT OFFICE.

EDWARD H. DEWSON, OF NEW YORK, N. Y., ASSIGNOR TO THE WESTINGHOUSE AIR BRAKE COMPANY, OF WILMERDING, PENNSYLVANIA, A CORPORATION OF PENNSYLVANIA.

CAR-BRAKE MECHANISM.

1,269,263.  Specification of Letters Patent.  Patented June 11, 1918.

Application filed October 22, 1915.  Serial No. 57,249.

*To all whom it may concern:*

Be it known that I, EDWARD H. DEWSON, of the borough of Manhattan, in the city, county, and State of New York, have invented a certain new and useful Improvement in Car-Brake Mechanism, of which improvement the following is a specification.

This invention relates to brake mechanism for cars, and more particularly to that type in which the brake is automatically applied under the control of a spring or other means normally tending to actuate the mechanism to apply the brake, and a manually operated device for opposing the action of the spring and for regulating the application of the same to any desired degree. A familiar construction of this type is the so-called "momentum brake," in which a friction clutch normally tending to be forced into engagement by the action of a spring, is employed for connecting a winding drum to the car axle and operate the brake chain to apply brakes by the momentum of the vehicle, the action of the spring on the clutch being opposed and governed by the motorman's hand lever.

In this type of brake mechanism it may be desired to apply the brakes independently from a different point than that usually occupied by the motorman, and by a different person, as for instance, the conductor or other employee, or a passenger, and the object of my present invention is to provide means for interrupting the control of the brakes by the motorman and allow the spring to actuate the mechanism to cause an application of the brake independently of the motorman.

Another object is to provide improved means under the control of the conductor for effecting an application of the brakes independently of the motorman. These and other objects will now more fully appear from the following detailed description of a preferred form of construction, and the novel features will be set forth in the appended claims.

In the accompanying drawing: Figure 1 is a diagrammatic plan of a brake mechanism embodying my improvement; and Fig. 2, a section taken transversely of the car and showing the brake connections in elevation.

My improvement is adapted to be applied in connection with various forms of brake appliances designed to be actuated by the momentum of the vehicle, and I have shown a common form of this type comprising a winding drum, 3, loosely mounted on the car axle and connected by chain, 4, with the brake rigging in the usual manner. A friction clutch device, 5, having a spring actuated member, 6, slidably mounted on the axle but connected to turn therewith, is employed to operate the winding drum when the clutch members, which may be of any suitable type, are forced into engagement by the action of the spring, 7. For holding the spring compressed and the clutch released, a bell crank lever, 8, may be provided having one arm bifurcated to engage a loose ring mounted in a groove of the clutch member, 6, and the other arm connected by a rod, 9, with a manually operated device under the control of the motorman for holding the clutch out of action, and for varying the pressure with which the same may be applied.

According to my present improvement, I provide means whereby the brake may also be applied from another point, as by the conductor of the car, and in order to make it impossible for the motorman to interfere with such application, I preferably provide means controlled by the conductor's handle for interrupting or disconnecting the motorman's control of the brake mechanism at the time that the same is operated by the conductor.

Various forms of connecting mechanism may be employed for this purpose, but according to a preferred construction, such as indicated in the drawing, a shaft, 10, may be mounted at some intermediate or middle portion of the car beneath the car floor, and carry a wheel, 11, fixed on said shaft, two arms, 12 and 12$^a$, loosely pivoted thereon, and clutch members, 13 and 13$^a$, slidably mounted thereon but keyed to turn therewith. The arms, 12 and 12$^a$, are each provided with a clutch face having an offset adapted to engage a corresponding face on the respective clutch members, 13 and 13$^a$, and be locked therewith when the arm is turned in one direction, the springs, 14 and 14$^a$, acting to normally hold said clutch faces in engagement.

The brake rods, 9, and 9$^a$, leading to opposite ends of the car may be attached by short flexible connections at opposite sides of the wheel, 11, while the outer ends of the arms, 12 and 12$^a$, are connected by the respective rods, 15 and 15$^a$, with the brake handles, 23, at the opposite ends of the car. The clutch members, 13 and 13ª, may be thrown out of engagement with the respective arms 12 and 12ª, by any suitable connections, such as levers, 16 and 16ª, actuated by link, 17, bell crank, 18, rod, 19, bell crank, 21, rod, 22, and conductor's handle, 20.

When the motorman's brake handle is turned to release position, it operates through rod connection, 15, and arm, 12, to turn the clutch member, 13, shaft, 10, and wheel, 11, so as to exert sufficient pull on brake rod, 9, acting through bell crank, 8, to hold the spring, 7, compressed and the friction clutch, 5, released. This is also the usual running position and the axle is then free to turn independently of the winding drum. When the motorman applies the brake, the handle, 23, is turned a greater or less distance to allow the spring, 7, to force the friction clutch into engagement to wind up the drum, 3, and apply the brakes to the wheels. The force of the brake application depends upon the distance the brake handle is moved to permit the spring to expand. The force of the spring acting through rod, 9, wheel, 11, shaft, 10, and the clutch members, 13 and 13ª, constantly tends to turn the arms, 12 and 12ª, by the engagement of the interlocking projections on the clutch faces, this force being resisted and controlled by the brake handle, 23, and rod, 15, from one end of the car, or from a similar brake handle, (not shown), and rod, 15ª, when the brakes are being operated from the other end of the car, the brake handle being provided with the usual stops in its different positions.

When for any reason it is desired that the conductor should apply the brakes, the handle, 20, is simply turned sufficiently to move the clutch member, 13, longitudinally of its shaft against the spring, 14, and out of engagement with its arm, 12, thereby releasing the arm and permitting the spring, 7, to fully expand and apply the brake with full force. This construction operates to interrupt the connection between the arm, 12, and the shaft, 10, so that the motorman is powerless to interfere with the application of the brakes when the conductor's handle is shifted. The connections from the conductor's handle operate to throw out both clutch devices, 13 and 13ª, in order to release both arms, 12 and 12ª, and cut out the motorman's connections to either end of the car. When the conductor's handle is restored to its normal position, the springs, 14 and 14ª, will again shift the clutch members, 13 and 13ª, into engagement with the arms, 12 and 12ª, and restore the connection and control to the motorman.

Having now described my invention, what I claim as new and desire to secure by Letters Patent is:

1. The combination with a brake applying mechanism, and a spring device normally tending to cause the brakes to apply, of a manual element under the control of the motorman for opposing said spring and regulating the action of the same, and an independent manually operated means for interrupting the motorman's control and releasing the spring device to apply brakes.

2. The combination with a brake applying mechanism and a spring device normally tending to cause the brakes to apply, of a manual element under the control of the motorman for opposing said spring and regulating the action of the same, and another manually operated means connected to the spring device for releasing same independently of the position of the motorman's element.

3. The combination with a brake applying mechanism and a spring device normally tending to cause the brakes to apply, of a motorman's brake handle, a connection from said handle to the spring device and including a clutch element, and an independent manually operated means having a connection for throwing said clutch element out of engagement.

4. The combination with a momentum operated brake applying means, and a spring device normally tending to force same into action, of a motorman's brake handle, connections therefrom for controlling the action of said spring, and an independent manually operable means for interrupting the connection between the motorman's brake handle and said spring and for releasing said spring.

5. The combination with a brake applying mechanism and means normally tending to cause the brakes to apply, of a manual element under the control of the motorman for regulating the action of said means, and an independent manually operated device for interrupting the motorman's control and permitting the brakes to automatically apply.

6. The combination with a brake applying mechanism and means normally tending to cause the brakes to apply, of a manual element under the control of the motorman for regulating the action of said means, and an independent manually operated device connected to said means for actuating the same independently of the position of the motorman's element.

In testimony whereof I have hereunto set my hand.

EDWARD H. DEWSON.